United States Patent [19]

Beske

[11] 3,929,658

[45] Dec. 30, 1975

[54] MAGNETIC RECORDING COMPOSITIONS AND ELEMENTS OF LOW ABRASIVENESS AND PROCESS FOR MAKING THEM

[75] Inventor: Grant A. Beske, Princeton Junction, N.J.

[73] Assignee: E. I. Du Pont de Nemours & Company, Wilmington, Del.

[22] Filed: Dec. 2, 1974

[21] Appl. No.: 529,005

Related U.S. Application Data

[63] Continuation-in-part of Ser. No. 303,052, Nov. 2, 1972, abandoned.

[52] U.S. Cl. .............. 252/62.54; 427/128; 428/329

[51] Int. Cl.[2] ........................ H01F 1/30; G11B 5/62

[58] Field of Search .................. 252/62.54; 427/128; 428/329

[56] References Cited

UNITED STATES PATENTS

| | | | |
|---|---|---|---|
| 3,503,882 | 3/1970 | Fitch | 252/62.54 |
| 3,622,386 | 11/1971 | Larsen | 252/62.54 X |
| 3,630,910 | 12/1971 | Akashi et al. | 252/62.54 |
| 3,639,245 | 2/1972 | Nelson | 252/62.54 X |
| 3,677,817 | 7/1972 | Muri et al. | 252/62.54 X |
| 3,687,725 | 8/1972 | Hartmann et al. | 252/62.54 X |
| 3,766,074 | 10/1973 | Brouillette | 252/62.54 |
| 3,833,412 | 9/1974 | Akashi et al. | 252/62.54 X |
| 3,837,912 | 9/1974 | Roden | 252/62.54 X |

FOREIGN PATENTS OR APPLICATIONS

| | | |
|---|---|---|
| 1,953,459 | 6/1970 | Germany |

*Primary Examiner*—F. C. Edmundson

[57] ABSTRACT

Magnetic recording compositions of low abrasiveness comprising, dispersed in an organic polymeric binder, ferromagnetic particles and finely divided particles of nonferromagnetic metal oxide having a Moh hardness of 5.5 or less, are formed into magnetic recording layers.

4 Claims, No Drawings

MAGNETIC RECORDING COMPOSITIONS AND ELEMENTS OF LOW ABRASIVENESS AND PROCESS FOR MAKING THEM

CROSS-REFERENCE TO RELATED APPLICATION

This application is a continuation-in-part of application Ser. No. 303,052, filed Nov. 2, 1972, now abandoned by Grant A. Beske.

BACKGROUND OF THE INVENTION

1. Field of the Invention

This invention relates to ferromagnetic compositions and their use in magnetic recording members. More particularly it relates to magnetic recording tapes of reduced abrasiveness prepared by improved procedures from new ferromagnetic compositions.

2. Description of the Prior Art

In the magnetic recording art, especially with magnetic tapes, it has long been recognized that the recording and playback heads are subject to wear from the constant passage of the tape containing hard, abrasive ferromagnetic particles. In audio recording, the problem is present but not acute, because the heads used are relatively inexpensive to replace when badly worn, and because tape pressure against the head and tape speed past the head are both relatively low. However, the problem becomes severe in computer and television applications. Because of the extremely high signal frequencies encountered in these uses, the heads must be made with a high degree of electrical and mechanical precision with a consequent high cost of manufacture. At the same time, the head gaps must be very shallow and the tape must traverse the head at velocities of thousands of feet per minute, with the result that heads made from the most durable available materials have a short life and a high replacement cost.

One approach to improved head life has been to reduce the abrasiveness of the tape by the incorporation of particulate lubricants such as carbon black and the sulfides of tungsten and molybdenum as described, for example, in U.S. Pat. Nos. 3,387,993, 3,423,233, 3,437,510, 3,476,596, British Pat. No. 868,346 and German Pat. No. 1,297,671. Another approach has been to maintain signal stability by making head wear more uniform by including in the tape very hard particles that are even more abrasive than the ferromagnetic particles, such as flint, garnet, silicon carbide, as described, for example, in U.S. Pat. No. 3,630,910 and in German Pat. Nos. 1,804,393 and 1,953,459. There has remained, however, a need for improvement in tape abrasiveness that will minimize the problem of head wear.

SUMMARY OF THE INVENTION

The present invention relates to a ferromagnetic composition comprising ferromagnetic particles dispersed in an organic polymer binder, said composition also containing about 2 to about 20 percent, based on the weight of the ferromagnetic particles, of finely divided particles of at least one nonferromagnetic metal oxide having a hardness of 5.5 or less on the Moh scale.

DESCRIPTION OF THE PREFERRED EMBODIMENTS

For the magnetic component of the ferromagnetic compositions and members of the invention, there may be used any of the particulate magnetic particles known in the art, such as $\gamma$-iron oxide, chromium dioxide, or various alloys, for example, those described in U.S. Pat. Nos. 3,535,104 and 3,567,525. A preferred material is acicular chromium dioxide having a tetragonal crystal structure of the rutile type, and a mean particle length not greater than 10 $\mu$m, with no more than 10 percent of the particles having a length greater than 10$\mu$m. The chromium dioxide crystals may, if desired, include modifying elements, and the initial particles may have been treated to improve the level and stability of their magnetic characteristics. Suitable chromium dioxide materials are described in a number of patents, representative of which are U.S. Pat. Nos. 2,885,365, 2,923,683, 2,923,684, 2,923,685, 2,956,955, 3,034,988, 3,278,263, 3,512,930 and 3,529,930.

The preferred ferromagnetic chromium oxides have an intrinsic coercive force, $H_{ci}$, of 200 oersteds or greater; a saturation magnetization, $\sigma_s$, of at least 70 emu/g; and a remanent magnetization, $\sigma_r$, of at least 30 emu/g. Intrinsic coercive force, $H_{ci}$, is defined in Special Technical Publication No. 85 of the American Society for Testing Materials entitled "Symposium on Magnetic Testing" (1948), pp. 191–198. This property can be determined on a DC ballistic-type apparatus of the kind described by Davis and Hartenheim in *Review of Scientific Instruments*, 7, 147 (1936). Saturation per gram, $\sigma_s$, and remanence per gram, $\sigma_r$, are defined on pp. 5–8 of Bozorth's "Ferromagnetism," D. Van Nostrand Co., New York (1951). These properties can be determined with apparatus of the kind described by T. R. Bardell on pp. 226–228 of "Magnetic Materials in the Electrical Industry," Philosophical Library, New York (1955).

As the organic polymeric binder, there may be employed any of the commercially available polymers commonly used in preparing magnetic tapes and other magnetic recording members. Alternatively, the binder can be a polymer prepared by addition polymerization or condensation polymerization from commercially available monomers. Representative macromolecular, film-forming, organic polymer binding agents are polyurethanes, epoxides, vinyl polymers, polyacrylic or polymethacrylic acids or esters thereof, polybutadiene, polycarbonates, cellulose esters, and mixtures of the polymers or copolymers of two or more of the monomers of the foregoing polymers. Those skilled in the art can readily select from the large number of available polymers those that will give the desired combination of such properties as strength, elasticity, surface uniformity, smoothness, and the like. One preferred material is a soluble preformed polyester-polyurethane elastomer resin based on diphenylmethane diisocyanate, adipic acid, and an alkanediol having 2–4 carbon atoms. If desired, a binder of this kind may be hardened with such agents as polyfunctional isocyanates, e.g., 2–4-toluene diisocyanate/trimethylol propane (5/2), 4,4'-methylene-bis(cyclohexylisocyanate), and the like. Other preferred binders are the commercially available copolymers of vinylidene chloride with acrylonitrile, of butadiene with acrylonitrile and of vinyl chloride with vinyl acetate; and these may also be usefully combined with the polyester-polyurethane elastomer resins previously described. The binders preferably have molecular weights greater than 20,000, and more preferably greater than 100,000.

The compositions will ordinarily contain from 1 to 98 percent, and preferably from 65–75 percent or more, by weight of ferromagnetic particles. Correspondingly, the binder will preferably comprise from about 25 percent or less to about 35 percent by weight of the dry composition. When particularly preferred magnetic particles and binder compositions are used, as described in U.S. Pat. No. 3,649,541, the magnetic particles may comprise up to about 86 percent by weight of the dry composition.

The compositions may include conventional amounts of other conventional ingredients, such as dispersing agents, antistatic agents, lubricants, fungicides, and the like. Useful dispersing agents are lecithin, the monomeric cyclic amines of U.S. Pat. No. 3,585,141, the organophosphorous compounds of U.S. Pat. No. 3,586,630, the tertiary-amine-containing polymers of U.S. Pat. No. 3,558,492, and the long-chain ammonium salts of U.S. Pat. No. 3,634,252. Representative lubricants are the amides, the alkyl esters, and the metal salts of long-chain fatty acids; the hydrocarbyl silicone oils; saturated and unsaturated long-chain hydrocarbons; fluorocarbon telomers; and the like.

According to the invention, the compositions also contain small, abrasiveness decreasing, amounts of finely divided nonferromagnetic metal oxides. Preferably, the nonferromagnetic metal oxides are present in a concentration of about 2 to about 20 percent, based on the weight of the magnetic particles in the composition, the nonferromagnetic metal oxides having a hardness of 5.5 or less on the Moh scale and a particle size in the range of about 0.2$\mu$ to about 5.0$\mu$. Particularly preferred materials are anatase titanium dioxide (Moh hardness = 5.5) and molybdenum trioxide (Moh hardness = 2.0). Naturally occurring minerals that comprise two or more metal oxides, with or without water of crystallization, may also be used so long as they meet the requirements of hardness and particle size already mentioned. Representative but not limiting are the following:

| Mineral Name | Composition | Moh Hardness |
|---|---|---|
| Arsenolite | $As_2O_3$ | 1.5 |
| Brucite | $MgO.H_2O$ | 2.5 |
| Calamine | $2ZnO.SiO_2.H_2O$ | 4.5–5.0 |
| Chromite | $FeO.Cr_2O_3$ | 5.5 |
| Crocoite | $PbO.CrO_3$ | 2.5–3.0 |
| Cuprite | $Cu_2O$ | 3.5–4.0 |
| Emmonsite | $FeTeO_3$ | 2.0 |
| Hausmannite | $Mn_3O_4$ | 5.0–5.5 |
| Minium | $Pb_3O_4$ | 2.0–3.0 |
| Tenorite | $CuO$ | 3.0–4.0 |
| Zincite | $ZnO$ | 4.0–4.5 |

The weights, parts and percentages of the various components are discussed hereafter in terms of the final dry magnetic compositions, i.e., binder, magnetic particles, nonmagnetic particles, dispersing agent, lubricant, plus other ingredients, but it will be understood that the compositions are initially made up from solutions of the various components, where it is not feasible to use a given component, e.g., a polymeric binder, in its undissolved form. The solvent content of a given composition is, of couse, evaporated in the course of putting the composition in the form of a useful magnetic recording member. The choice of solvent will be governed by the solubility characteristics of the binder resin(s), dispersing agent, lubricant, and other materials selected for the composition. Representative solvents are tetrahydrofuran, acetone, cyclohexanone, and methyl ethyl and methyl isobutyl ketones. Mixtures of two or more such solvents can be used.

In preparing magnetic recording compositions according to this invention, the procedures described below may be employed. In a typical procedure, the magnetic particles, the nonmagnetic particles, the dispersing agent and a quantity of solvent are placed in a container together with an amount of Ottawa sand equal to 4–6 times the combined weight of the magnetic and nonmagnetic particles. The container is closed and the ingredients are slurry-milled, for example, with the aid of a paint conditioner or shaker oscillating at about 700–1,000 cycles per minute. The milling may also be accomplished conveniently by the use of one or more stirring discs, e.g., two discs in tandem, rotating at peripheral speeds of 1,000–2,000 feet per minute. Conventional ball-milling and pebble-milling can also be used. There is then added a solution of the polymeric binder component(s) in an amount sufficient to give the desired proportion of binder in the final dry composition. After further milling or shaking, there may be additions of such other components as lubricants, cross-linking agents, and the like, and it will frequently be desirable that the additions be made as solutions of these various ingredients. When sufficient final mixing and milling have been carried out, the dispersion may be filtered, deaerated, and adjusted to desired final viscosity by addition of solvent.

The dispersions prepared in this way may be cast by conventional techniques to form self-supporting films which may serve as integral magnetic recording members. Alternatively, they may be coated, by means of a doctor knife adjusted to give a coating of the desired thickness, on any suitable base material to form supported magnetic recording members. A particularly useful coating technique is the gravure-coating procedure described in Long, U.S. Pat. No. 3,468,700 and carried out with apparatus such as that described in Long, U.S. Pat. No. 3,392,701. Among the base materials that may be used are nonmagnetic metal sheets, plates, discs, drums, and the like, and previously prepared films, sheets, or tapes made from any of a number of organic polymeric materials having suitable characteristics of strength, dimensional stability, surface friction, and the like, all as well understood by those skilled in this art, e.g., films of cellulose acetate or polyethylene terephthalate. In either case, i.e., supported or nonsupported, the films or coatings may be passed while the coating is still fluid between opposing magnets having an orienting field strength sufficient to align the magnetic particles in parallel fashion. The films or coatings containing the oriented magnetic particles are then allowed to dry at room or elevated temperature, and, when they contain cross-linking agents, to cure at temperatures and for periods of time sufficient to produce cross-linking of the polymers in the compositions.

Calendering of the dried film or coating is then carried out by conventional means on conventional equipment. A typical calendering operation will involve passing the film or coating between a cotton-filled roll and a polished chrome-plated steel roll having its surface at a temperature of about 105°C. at a pressure of 1,000–1,200 pounds per linear inch. When the magnetic recording member is in the form of a coating on a supporting film, the coated side of the film will be in contact with the polished steel roll.

The calendered film or coating may then be submitted to a burnishing operation to improve further the smoothness of its surface. Suitable equipment and procedures for this purpose are well known in the art and are described, for example, in U.S. Pat. No. 2,688,567 and at pages 80–81 or Pear, "Magnetic Recording in Science and Industry," Reinhold Publishing Corporation, New York (1967), as well as in the examples hereinafter.

The invention will be further explained by the following examples. The chromium dioxide used in these examples was prepared according to Cox U.S. Pat. No. 3,278,263, had the physical and magnetic characteristics previously described, and was further made ready by mechanical milling to break up agglomerates and insure uniform fine particle size. All of the compositions of the examples employed, as either sole or major binder resin component, a polyesterpolyurethane resin based on diphenylmethane diisocyanate, adipic acid, and an alkanediol of 2–4 carbon atoms or a mixture of such alkanediols, referred to hereafter for convenience as "polyurethane resin." All of the compositions also contained a polyfunctional isocyanate hardening agent, the reaction product of 5 moles of 2,4-toluene diisocyanate with 2 moles of trimethylolpropane, referred to hereafter for convenience as "isocyanate hardener." All compositions were prepared by sand-milling techniques like those previously described, with the use of tetrahydrofuran, cyclohexanone, and methyl isobutyl ketone as solvents. All were coated by conventional techniques on a polyethylene terephthalate film base and dried at temperatures of 50°–60°C. to remove solvent. After calendering and burnishing steps as described for each example, samples were slit to appropriate widths for the tests described hereafter.

EXAMPLE I

A composition having, on a dry basis, 76.6 percent by weight of total particulate matter dispersed in 23.4 percent by weight of binder was prepared by previously described procedures as follows:

| | Parts by Weight |
|---|---|
| Chromium dioxide | 27.0 |
| Anatase $TiO_2$, Moh hardness = 5.5, average particle size = ~0.3μm | 3.0 |
| Polyurethane resin | 4.66 |
| Vinylidene chloride/acrylonitrile (80/20) copolymer resin | 2.21 |
| Ioscyanate hardener | 1.20 |
| Soya lecithin | 0.80 |
| Butyl stearate | 0.30 |
| Stearamide | 0.03 |

The $TiO_2$ was present to the extent of 11.11 percent by weight of the weight of the $CrO_2$. The composition was coated on a polyethylene terephthalate film base, dried at 50°C. to remove the solvents, then stored for 24 hours at room temperature. It was then calendered with one pass between a cotton-fllled roll and a polished chrome-plated steel roll having its surface at 100°C. at a pressure of 1,100 pounds per linear inch, with the coated side of the film in contact with the polished steel roll. The calendered film was then slit into strips one-half inch wide, the strips were wound on reels, and each strip was burnished by a number of passes at high speed over a thin sheet of alfesil (alloy of Fe = 84.5 percent; Al = 5.5 percent, Si = 10.0 percent).

Abrasiveness was then determined by running the samples on a commercial helical scan videotape recorder (Sony CV-2000, Sony Corp. of America) modified to operate at a head/tape velocity of 860 inches per second and with the standard heads replaced by thin alfesil shims. A sensitive mechanical gauge was used to measure the depth of material worn from the shims. For two samples of the composition of this example, the measured wear after 60 minutes of operation was 0.5μm and 0.75μm, and no further wear occurred after an additional 60 minutes of testing.

For confirmation, a second sample of the same composition was prepared, coated, dried, stored, calendered, burnished and tested in the same way. Wear results were 0.25μm and 0.5μm after 1 hour and 0.75μm after 3 hours of testing.

By comparison, Control A was prepared and tested in the same way except that the composition contained 30 parts by weight of chromium dioxide and no titanium dioxide, and was not, therefore, a composition according to this invention. When two samples were submitted to the same test for abrasiveness as before, wear of the alfesil shim after 60 minutes was 3.5μm and 10μm, i.e., from 5 to 40 times as great as for the composition of Example I according to the invention.

Also by comparison, Control B was prepared containing 15 parts by weight of $CrO_2$ and 15 parts by weight of $TiO_2$ in a composition otherwise the same as that of Example I. Thus, total content of particulate matter remained the same (30 parts by weight) but the nonmagnetic particles were present to the extent of 100 percent by weight of the weight of the magnetic particles, and the composition was, therefore, outside the scope of the invention. Procedures for preparation and testing were the same as for Example I. Wear after 60 minutes of testing of two samples was 11.5μm and 12.2μm, or 15–50 times greater than for the composition of Example I.

EXAMPLE II a. The procedures of Example I were followed for preparation and testing of compositions having, on a dry basis, 78 percent by weight total particulate mater dispersed in 22 percent by weight binder, as follows:

| | Example II | Control C |
|---|---|---|
| Composition, parts by weight: | | |
| $CrO_2$ | 28.9 | 32.1 |
| Anatase $TiO_2$ of Example I | 3.2 | 0.0 |
| Polyurethane resin | 6.870 | 6.870 |
| Isocyanate hardener | 0.722 | 0.722 |
| Soya lecithin | 0.722 | 0.722 |
| Butyl stearate | 0.027 | 0.027 |
| Wear, μm (individual samples) | | |
| After 1 hour | 0.0, 0.25, 0.25, 0.5 | 1.5, 1.5 |
| After 2 hours | 0.0, 0.25, 0.5, 0.75 | 2.0, 2.75 |

Example II, containing ~11 percent $TiO_2$ by weight on the weight of the $CrO_2$, showed no significant further wear of the alfesil shims after fifteen hours of testing.

b. The known effectiveness of burnishing as a means of reducing abrasiveness is substantially enhanced when the magnetic composition contains a nonferromagnetic metal oxide according to this invention. Samples of the calendered tapes of Example II and Control C were burnished by being passed 30 times across the square-ground sharp edge of a tungsten carbide block having a square cross-section of 0.164 inch on a side and a length of 1.25 inches. The tapes passed over the edge of the block under a tension of 6–9 ounces per inch and at an average speed of 480 inches per second. A comparison set of samples was not burnished.

Each sample was tested on a commercial helical-scan videotape recorder using tape of 1-inch width (Ampex VR-7500, Ampex Corp.) and operating in conventional fashion. In this test, each tape sample traversed the rotating alfesil head at a head-to-tape velocity of 1,000 inches per second, and the amount of material removed from the head was measured after 3 hours. Wear data are given below as total wear in $\mu m$ after 3 hours and as an average wear rate in $\mu m/hr$.

| Preparation | Example II ~11% $TiO_2$ Wear, $\mu m$ | Example II ~11% $TiO_2$ Rate, $\mu m/hr.$ | Control C No $TiO_2$ Wear, $\mu m$ | Control C No $TiO_2$ Rate, $\mu m/hr.$ |
|---|---|---|---|---|
| Not burnished | 30.6 | 10.2 | 60.0 | 20.0 |
| Burnished as described | 1.0 | 0.4 | 5.9 | 2.0 |

It will be noted that the abrasiveness of Example II is only half that of Control C for the "calendered only" samples, and that this advantage is increased to five times better after burnishing.

c. Additional samples of the compositions of Example II and Control C were made, coated, calendered and burnished by procedures basically the same as those previously described except in larger quantity on equipment of semicommercial scale. The coated films were slit to a width of one-half inch for testing on the commercial helical-scan videotape recorder described in Example I but equipped with single-crystal ferrite (alloy of $Fe_2O_3$ = 68 percent, MnO = 18 percent, ZnO = 14 percent) heads, a material somewhat harder and more abrasion resistant than the alfesil shims and heads used in the previously described test methods. For this harder material, wear is expressed in terms of $\mu m/100$ hr. Again, it will be seen that the tapes of Example II, illustrative of this invention, in both burnished and unburnished forms, were markedly superior to corresponding samples of Control C.

| | Wear, $\mu m/100$ hr. Example II ~11% $TiO_2$ | Wear, $\mu m/100$ hr. Control C No $TiO_2$ |
|---|---|---|
| Not burnished | 3.7 | 11.0 |
| Burnished | 0.0 | 6.4 |

In tests of their magnetic recording performance and characteristics, tapes of the $TiO_2$-containing Example II were not adversely affected by the incorporation of the nonferromagnetic metal oxide, according to this invention. On the contrary, they were at least equivalent, and in some respects superior, to tapes of Control C, representative of the prior art, and to commercially available tapes of known high quality.

EXAMPLE III

Example III and Controls D and E duplicated, respectively, the compositions, variables, and procedures of Example I and Controls A and B, except that the anatase $TiO_2$ of Example I and its controls was replaced by molybdenum trioxide, $MoO_3$, having a Moh hardness of 2.0 and a particle size in the range 0.2–5.0$\mu m$. Results reported below for individual samples tested as described for Example I show that the incorporation of ~11 percent $MoO_3$ according to the invention was effective in reducing abrasiveness.

| | | Wear, $\mu m$ |
|---|---|---|
| Example III, ~11%* $MoO_3$, | 1 hour | 0.25, 0.5, 0.5, 0.75 |
| | 2 hours | 0.5 0.5, 0.75, 0.75 |
| Control D, no $MoO_3$, | 1 hour | 4.0, 9.0 |
| Control E, 100%* $MoO_3$, | 1 hour | 7.25, 8.25 |

* By weight on weight of $CrO_2$

For confirmation, a second sample was prepared duplicating Example III. Wear after 1 hour was 0.5–1.0$\mu m$.

From the foregoing it will be seen that magnetic recording compositions of this invention made into magnetic recording elements by the process of this invention have significantly lower abrasiveness than prior art compositions and elements, without loss of desirable magnetic performance characteristics. Because they minimize head wear, they permit recording and playback heads to be used for longer periods of time without serious deterioration of their performance, especially output. They result in substantial economy by increasing the useful life of the heads and prolonging the time before replacement of the heads is required. Because of the high cost of precise and durable heads, especially for television recording, this is a significantly useful advantage. Secondarily, wear on other machine parts with which a tape comes in contact is also reduced and maintenance expense thereby minimized.

What is claimed is:

1. In a magnetic recording composition comprising ferromagnetic particles having a mean particle length not greater than about 10 microns dispersed in an organic polymeric binder, the improvement wherein said composition further comprises from about 2 to about 20 percent, based upon the weight of said ferromagnetic particles, of finely divided particles of at least one nonferromagnetic metal oxide having a hardness of 5.5 or less on the Moh scale selected from the group consisting of amatase titanium dioxide, molybdenum trioxide, brucite, calamine, chromite, cuprite, emmonsite, hausmannite, tenorite and zincite and a particle size in the range of about 0.2 to about 5.0 microns.

2. The magnetic recording composition of claim 1 wherein said ferromagnetic particles comprise particles of acicular chromium dioxide having a mean particle length of less than about 10 microns, with no more than about 10 percent of the particles having a length greater than 10 microns.

3. The magnetic recording composition of claim 1 wherein said particles of nonferromagnetic metal oxide are selected from the group consisting of anatase titanium dioxide particles and molybdenum trioxide particles.

4. The magnetic recording composition of claim 2 wherein said particles of nonferromagnetic metal oxide are selected from the group consisting of anatase titanium dioxide particles and molybdenum trioxide particles.

* * * * *